United States Patent [19]
Eriksson

[11] Patent Number: 5,186,227
[45] Date of Patent: Feb. 16, 1993

[54] DRIVING DEVICE

[76] Inventor: Jan Eriksson, Box 4, 810 20, Österfärnebo, Sweden

[21] Appl. No.: 582,933

[22] PCT Filed: Apr. 12, 1989

[86] PCT No.: PCT/SE89/00202
§ 371 Date: Oct. 9, 1990
§ 102(e) Date: Oct. 9, 1990

[87] PCT Pub. No.: WO89/09685
PCT Pub. Date: Oct. 19, 1989

[30] Foreign Application Priority Data
Apr. 13, 1988 [SE] Sweden ................. 8801353

[51] Int. Cl.⁵ ................. B27L 1/00; B27B 31/00
[52] U.S. Cl. ................. 144/242 D; 144/2 Z;
144/245 A; 144/343; 198/626.6; 198/697;
198/699; 305/35 EB
[58] Field of Search ........... 144/2 Z, 3 D, 245 A,
144/242 D, 246 F, 343; 198/626.6, 697, 699;
305/35 EB, 51

[56] References Cited
U.S. PATENT DOCUMENTS

| 4,660,327 | 4/1987 | Bando | 198/626.6 |
| 4,742,854 | 5/1988 | Forslund | 144/2 Z |
| 4,809,846 | 3/1989 | Hodkwsky | 198/626.6 |
| 4,834,156 | 5/1989 | Forslund | 144/245 A |

Primary Examiner—W. Donald Bray
Attorney, Agent, or Firm—Zarley, McKee, Thomte, Voorhees & Sease

[57] ABSTRACT

A driving device comprises at least one chain (16) in the form of a closed loop. The chain is connected to at least one driving member arranged to cause the chain to orbit. Furthermore, the chain is laid over diverting members which in combination with the driving member determine the form of the loop. A rubber element (17) is arranged on the face of the chain located outermost in the loop and forms a configuration generally enclosing the chain loop. The rubber element (17) is in a driving force transmitting engagement with the chain (16) to be caused to orbit thereby. The rubber element (17) serves for engagement with for instance tree trunks over a large surface.

13 Claims, 11 Drawing Sheets

DRIVING DEVICE

FIELD OF INVENTION AND PRIOR ART

This invention is related to a driving device comprising a chain in the form of a closed loop, said chain being connected to at least one driving member adapted to cause the chain to orbit and said chain being laid over diverting members determining the form of the loop, one of said diverting members possibly being formed by the driving member proper, said chain being adapted to face towards a supporting surface or an object, on which surface or object driving power is to be applied, with a portion of its side located outermost in the loop.

Such devices intended for forest harvesters are previously known. In these devices the chain is intended to be applied against a tree trunk to move the same through the harvester. In order to obtain a sufficiently power transferring engagement between the chain and a tree trunk, the chain comprises spike like projections, which, however, have turned to cause unacceptable trunk damages and associated wood losses. This deficiency of the devices known has turned out to be so grave that they have not obtained commercial acceptance although the devices cause the advantage that they thanks to the use of a chain may obtain a comparatively large abutment surface against the tree trunks.

SUMMARY OF THE INVENTION

The object of the present invention is to develop the driving device initially defined so that it becomes capable of a much more lenient operation than the devices known. When using the driving device for feeding tree trunks and other wood pieces, the device according to the invention is, accordingly, intended to give rise to a considerably reduced degree of wood damages. However, the device according to the invention is also intended to be used within other technical areas, for instance for propelling vehicles, the purpose being to design the device so that propelling of the vehicle should be possible with damages as small as possible on the ground.

This object is according to the invention obtained in that the device comprises at least one rubber element, which is arranged on the side of the chain located outermost in the loop and forms a configuration substantially enclosing the chain loop, and that the rubber element is in a driving power transferring engagement with the chain to thereby be caused to orbit along with the chain.

Accordingly, the rubber element will operate as a contact pressure distributing interlayer between the chain and the object or the ground in question so that a considerably reduced damage on the object or ground is obtained with maintained excellent driving power application.

Preferable developments of the concept according to the invention are defined more closely in the dependent claims 2-13.

BRIEF DESCRIPTION OF THE DRAWINGS

With reference to the enclosed drawings, a more close description of embodiment examples of the invention will follow hereinbelow.

In the drawings:

FIG. 9 is a view of the device according to the invention used in connection with a tracked vehicle or crawler;

DETAILED DESCRIPTION OF PREFERRED EMBODIMENTS

Figure 1:
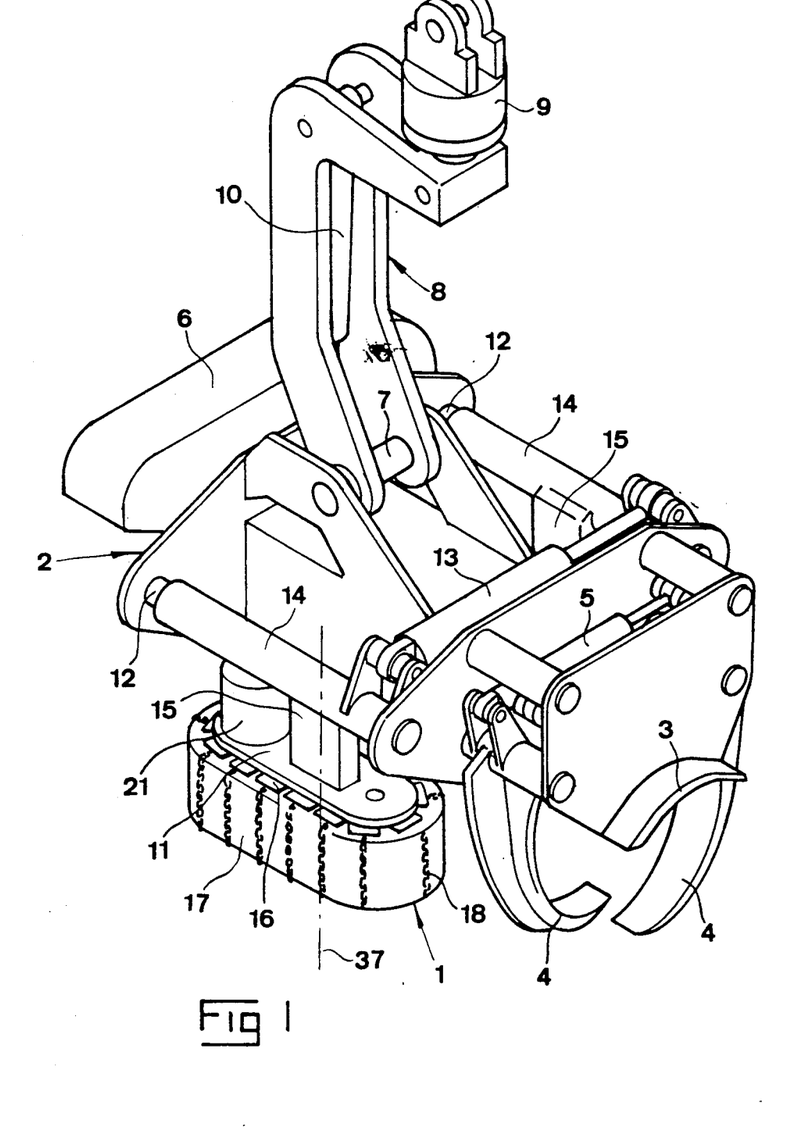
FIG. 1 is a perspective view illustrating a forest processor.

The driving device according to the invention is generally denoted 1 in FIG. 1 and illustrated as used with a forest machine for processing trees. The machine comprises a frame denoted 2, said frame having delimbing members 3, 4 at its front end. The one denoted 3 is rigidly arranged whereas those denoted 4 have the character of arms pivotable towards and away from each other by means of one or more power members 5. The machine comprises at its rear end a cutting device housed within a housing 6.

The frame 2 is connected to a carrying device 8 via a shaft 7 for connecting the machine to a suitable carrier, such as a crane arranged on a vehicle. The carrying device preferably comprises a rotator 9 to enable rotation of the machine about a vertical axis. A power member 10 of the type variable in length, e.g. a hydraulic cylinder, is connected between carrying device 8 and frame 2 to enable pivoting upwardly of the machine so that it may be applied on a standing tree. During processing of the tree the machine is intended to assume the position according to FIG. 1, the tree trunk being displaced through the machine by means of two driving devices 1 located on opposite sides of the trunk during delimbing of the trunk by means of delimbing members 3, 4.

The two driving devices 1, only one of which is apparent in FIG. 1, are movable towards and away from each other by means of a power member 13 of the type variable in length, e.g. a hydraulic cylinder. More specifically, the driving devices 1 are in the embodiment intended to be pivotingly displaced towards and away from each other but as an alternative a translation movement of the driving devices could also be possible as well as combinations of pivoting and translation movements. In the embodiment the power member 13 acts on ears rigidly connected to sleeves 14 rotatable about shafts 12. Connection members 15 are secured to these sleeves 14 and frame structures 11 of the driving devices 1 are connected to the connecting members 15.

Each of the driving devices comprises at least one chain 16 in the form of a closed loop, said chain being connected to at least one driving member adapted to cause the chain to orbit and said chain being laid over diverting members defining the form of the loop. The driving device comprises a rubber element 17 arranged on the side of the chain loop located outermost and forms a configuration substantially enclosing the chain loop. Rubber element 17 is in driving force transmitting engagement with the chain to thereby be caused to orbit along with the chain. As will be more specifically described hereinafter, anti-skid elements 18 may be arranged over the external side of the rubber element.

The word "rubber" used hereinabove in the expression "rubber element" should be interpreted in the widest sense. Thus, the word in question encompasses an elastically resilient material, the origin of which may be natural as well as synthetical.

Figure 2:
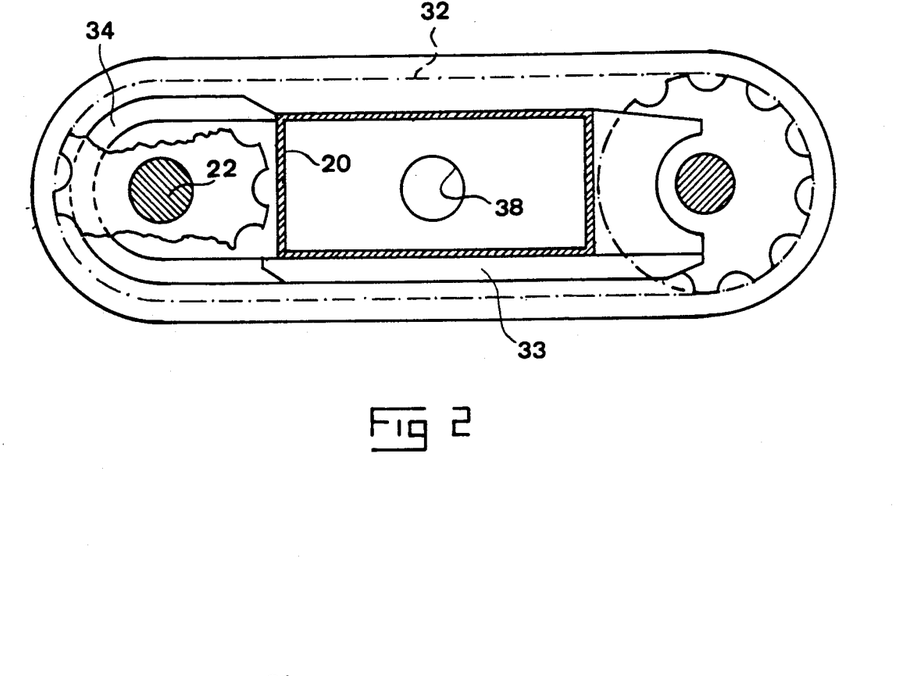
FIG. 2 is a view from above of a driving device comprised in FIG. 1, however, illustrated without chain and rubber element and partly cut.
Figure 3:
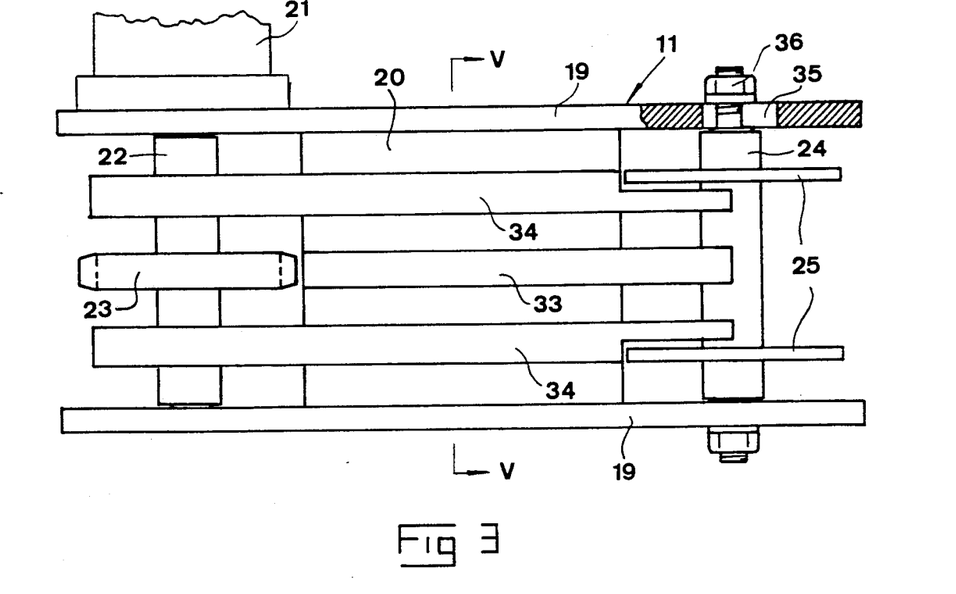
FIG. 3 is a view of the device as illustrated in FIG. 2 from below.

It appears more closely from FIGS. 2 and 3 that the frame structure 11 of the driving device comprises two outer plates 19, which are mutually located and connected by means of a case like member 20. A motor 21, e.g. a hydraulic motor, is arranged on frame 11 to drive the chain. This motor is secured to a drive shaft 22, on which a tooth wheel 23 intended to drivingly engage with the chain is non-rotatably attached. A second shaft 24 carrying diverting members 25 in the form of tooth wheels is rotatably arranged on frame 11.

Figure 4:
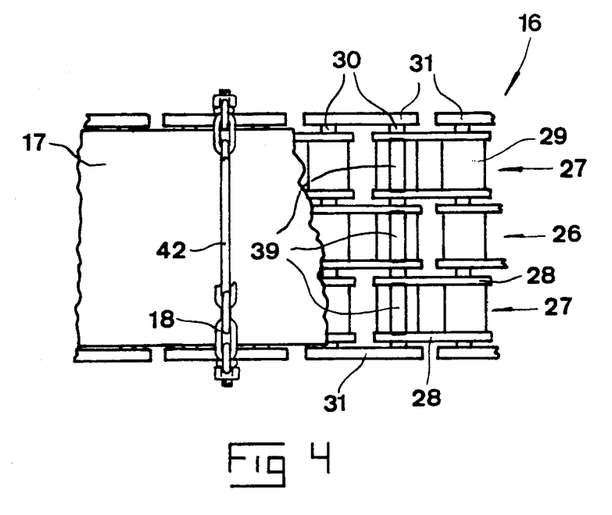
FIG. 4 is a plan view illustrating a chain used in the invention with associated rubber element and anti-skid elements.

It appears from the right part of FIG. 4 that the chain in question comprises three rows of links or strands 26, 27. The driving wheel 23 is intended to engage with the central link row 26 whereas diverting wheels 25 engage with the outer link rows 27. The chain links comprise side plates 28, between which rolls 29 are arranged. Pins 30 extend through side plates 28 and rolls 29 respectively and interconnect the chain links, the device preferably being such that the links in the central link row 26 are displaced relative to the outer link rolls 27. Two adjacent pins 30 are always interconnected by means of plate pieces 31 at the two side margins of chain 16.

The extent of chain 16 is illustrated in FIG. 2 by means of the cash dotted line 32. As appears from FIGS. 2 and 3 there are support members 33, 34 to support chain 16 between shafts 22 and 24 and these members 33, 34 are arranged at least on the side of the frame structure intended to be located most closely to the tree trunk. The central support member 33 is intended to support the rollers of the links in the central link row 26 whereas the outer support members 34 are intended to support the rolls of the links in the outer link rows 27. The outer support members 34 extend partially in overlapping relation to diverting wheels 25, which are relatively thin, and extend furthermore in a semi-circular arc in the area of driving wheel 23 to function as diverting members for the chain in combination with tooth wheel 23. On the other side of frame 11 support members could be missing so that the chain runs substantially freely between driving wheel 23 and diverting wheels 25. The support members 33, 34 have the character of rails secured to the case like connection member 20.

In order to adjust chain tension the shaft 24 is preferably designed adjustable towards and away from shaft 22, e.g. by arranging slots 35 in the plates 19 of the frame in combination with suitable members 36, such as screw devices, for fixing the position of shaft 24. In order to allow driving device 1 to adjust to conicity and other irregularities of tree trunks the frame 11 is suitably arranged pivotable about a shaft 37 (FIG. 1) extending substantially parallel to shafts 22 and 24 and located in the area therebetween as indicated in FIG. 2 with the shaft hole 38.

The rubber element 17 has preferably a closed ring shape and may, if so required, comprise internal reinforcements, preferably in the form of bands. As appears from FIG. 5, the inwardly located side of the rubber element will abut against the outwardly located side of chain 16. Since the chain 16 naturally comprises projections as well as recesses, it may be sufficient for establishing adequate driving force transmitting engagement between the chain and the rubber element that the latter, possibly with certain pretensioning, contacts the outer side of the chain; this is particularly the case since the rubber element on application of the driving device against a tree trunk indicated with dashed line in FIG. 5 will be pressed against the chain so that thereby the driving engagement between the chain and the rubber element is further enhanced. According to a particularly preferred embodiment it is, however, the intention to provide the chain 16 with particular driving force transmitting projections 39 located on the outer side of the chain and adapted to be received in recesses 40 on the inner side of rubber element 17. Projections 39 may as also appears from FIG. 4 have a plate like form and protrude perpendicularly from the chain links. Projections 39 may each be secured to side plates 28 of an individual chain link and may further be arranged in a row transversely to the longitudinal extent of the chain and be adapted to be received in a channel like recess 40 extending transversely to the loop direction of rubber element 17.

Although the rubber element 17 and chain 16 may be designed entirely separable from each other it is also within the scope of the invention to vulcanize the rubber element 17 onto portions of the chain or components or projections attached thereon, said components or projections accordingly being received within the rubber material. However, rubber element 17 should be so located on the outer side of the chain that it does not interfere with the engagement of the chain relative to the driving wheel and diverting members.

Figure 5:
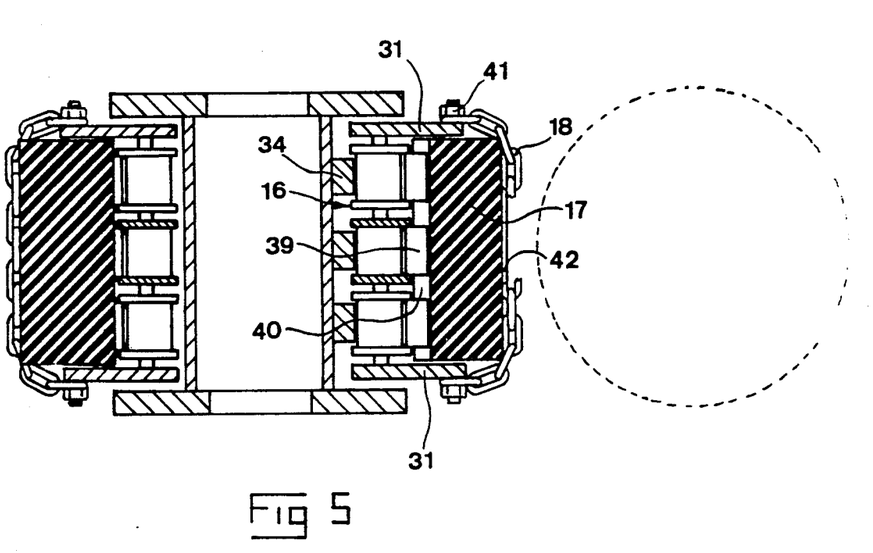
FIG. 5 is a section along the line V—V in FIG. 3, the device having been completed with chain, rubber element and anti-skid elements.

As appears from FIG. 5 the outer plates 31 of chain 16 are so extended outwardly that they overlap the side edges of rubber element 17 and accordingly will retain the rubber element in position externally of the chain while preventing movements sidewardly of the rubber element. Furthermore it appears from FIG. 5 (and also FIG. 1) that anti-skid elements 18, e.g. chains, are laid over the external side of rubber element 17, said anti-skid elements being at the side edge portions of the rubber element 17 attached to chain 16, in the embodiments more specifically to the side plates 31 of the chain, by means of suitable fixing members 41, e.g. bolts. It is suitable if the rubber element 17 on its outer side comprises grooves 42 extending across the rubber element and in which links of chains 18 are partially received. The chain links, which are partially received in grooves 42, are preferably those which are orientated with the link plane perpendicularly to the external side of the rubber element whereas the rest of the chain links abut flatly against rubber element portions surrounding grooves 42. The grooves 42 should be relatively narrow so that they counteract displacement sidewardly of the chain transversely to the longitudinal direction of grooves 42 on contact with the tree trunks.

When the driving device is applied against a tree trunk the chains 18 will at least partially be pressed into rubber element 17 so that the chains provide an excellent anti-skid action and cause a minimum of damaging influence on the tree trunk.

Figure 6:
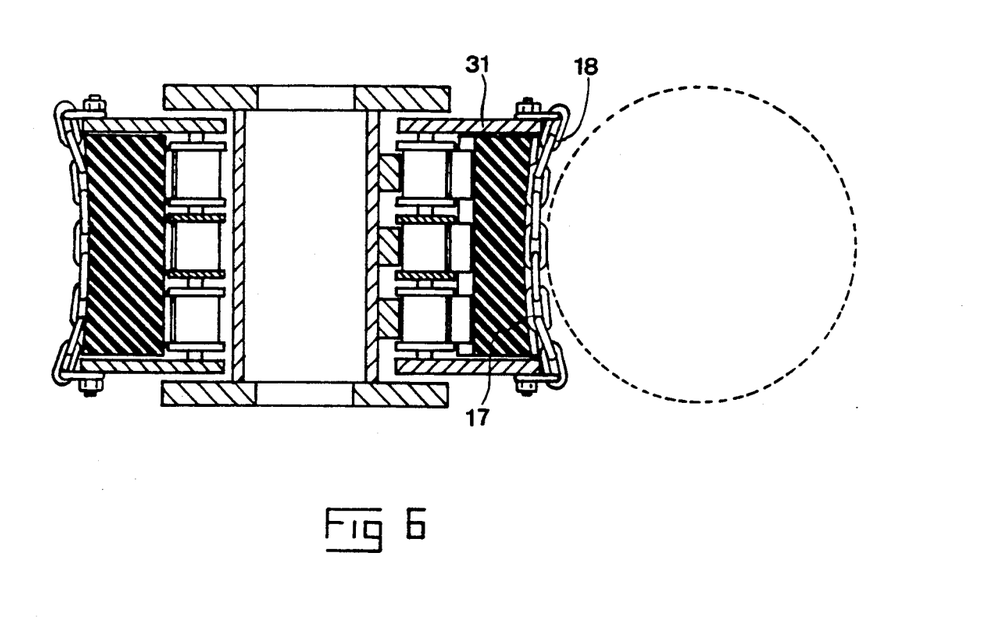
FIG. 6 is a view similar to FIG. 5 but illustrating an alternative embodiment.

The variant illustrated in FIG. 6 differs relative to FIG. 5 in that the side plates 31 serving as retainer members are extended furthermore outwardly and besides, the rubber element 17 has a concave external face, which is preferably since forces occurring on contact with a tree trunk tend to maintain the tree trunk in the central area of the rubber element. It should be ensured that chain 18 has such a length that it is allowed to be pressed into rubber element 17 on contact with the tree trunk; thus, it is the intention that the contact forces should be entirely applied onto rubber element 17 and not be adopted by the chains 18 through tensioning thereof.

Figure 7:
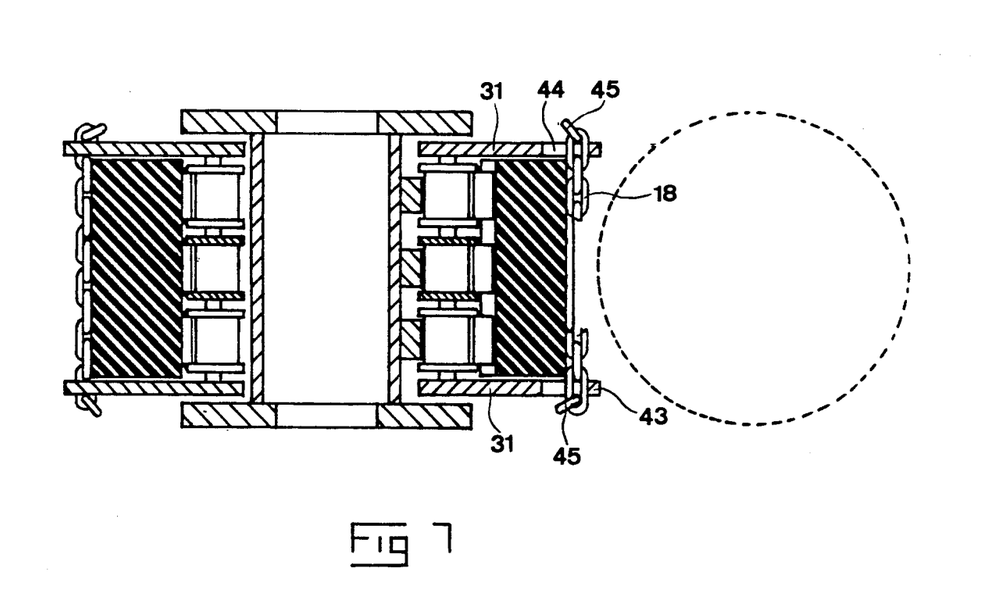
FIG. 7 is a view similar to FIGS. 5 and 6 and illustrating yet another alternative.

In the variant illustrated in FIG. 7 the side plates forming the retainer members 31 are extended so far that they protrude past the external face of the rubber element 17. This is desirable in particular as far as the lower, in position for use, of the side plates 31 is concerned since said side plate will form a protruding tongue 43, which by contacting the tree trunk will prevent the latter from moving so far downwardly that the trunk engagement is lost. For the rest, it is illustrated in FIG. 7 how chains 18 at their ends are received in slots 44 arranged in the side plates 31 so that accordingly the chain links received therein may move, during contact with the tree trunk, within the slots 44 so that undue tensioning of the chains is avoided. Pin like members 45 may serve for locking the chains in position by being received on the outer sides of the plates 31 in the chain links received in the slots 49, the plane of said chain links extending perpendicularly to the external face of the rubber element.

Figure 11:
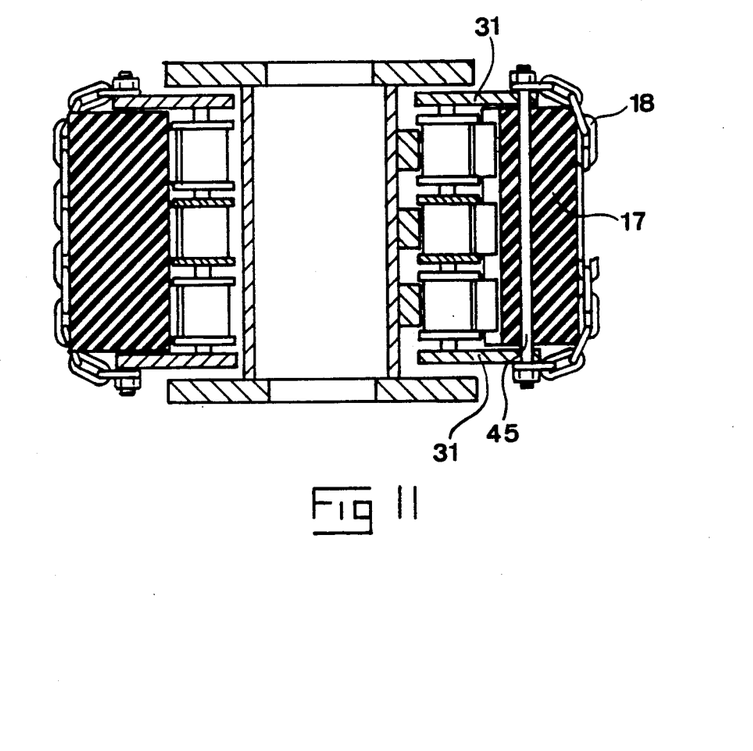
FIG. 11 is a view similar to FIGS. 5-7 but illustrating a fourth alternative.

The variant illustrated in FIG. 11 corresponds to FIG. 5 apart from the fact that anchoring members 45 extend between side plates 31, said anchoring members penetrating rubber element 17. The anchoring members 45 may have the character of bolts extending through holes provided in the rubber element and also serving for securing chains 18.

Figure 12:
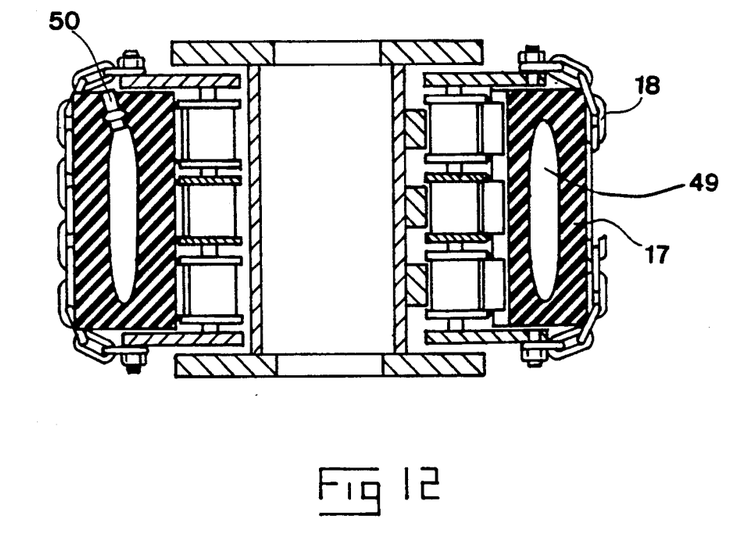
FIG. 12 is a view similar to FIGS. 5-7 but illustrating a further variant.

The variant illustrated in FIG. 12 corresponds to FIG. 5 apart from the fact that the rubber element 17 comprises a cavity 49. The latter may be provided for imparting to the rubber element an increased degree of resiliency. It is preferred that the cavity contains or is adapted for receiving a fluid, in particular air, at an overpressure relative to the surrounding atmosphere. The cavity may be entirely closed and provided with pressurized fluid already in connection with manufacturing. Alternatively, the cavity 49 may be intended to be provided with pressurized fluid after application of the rubber element about the chain and for this reason there is, as indicated to the left in FIG. 12, a connection 50 between the cavity and the surroundings, in which connection a suitable valve for maintaining the pressure in the cavity 49 is provided. The application of rubber element 17 about the chain is simplified if the cavity 49 is releaved from pressure during such application and not until thereafter is supplied wit h pressurized fluid, the rubber element then tending to expand and be intimately pressed against the chain and also against the anti-skid elements 18 if such occur. Of course, if so desired, several cavities separated from each other may be arranged within the rubber element.

Figure 8:
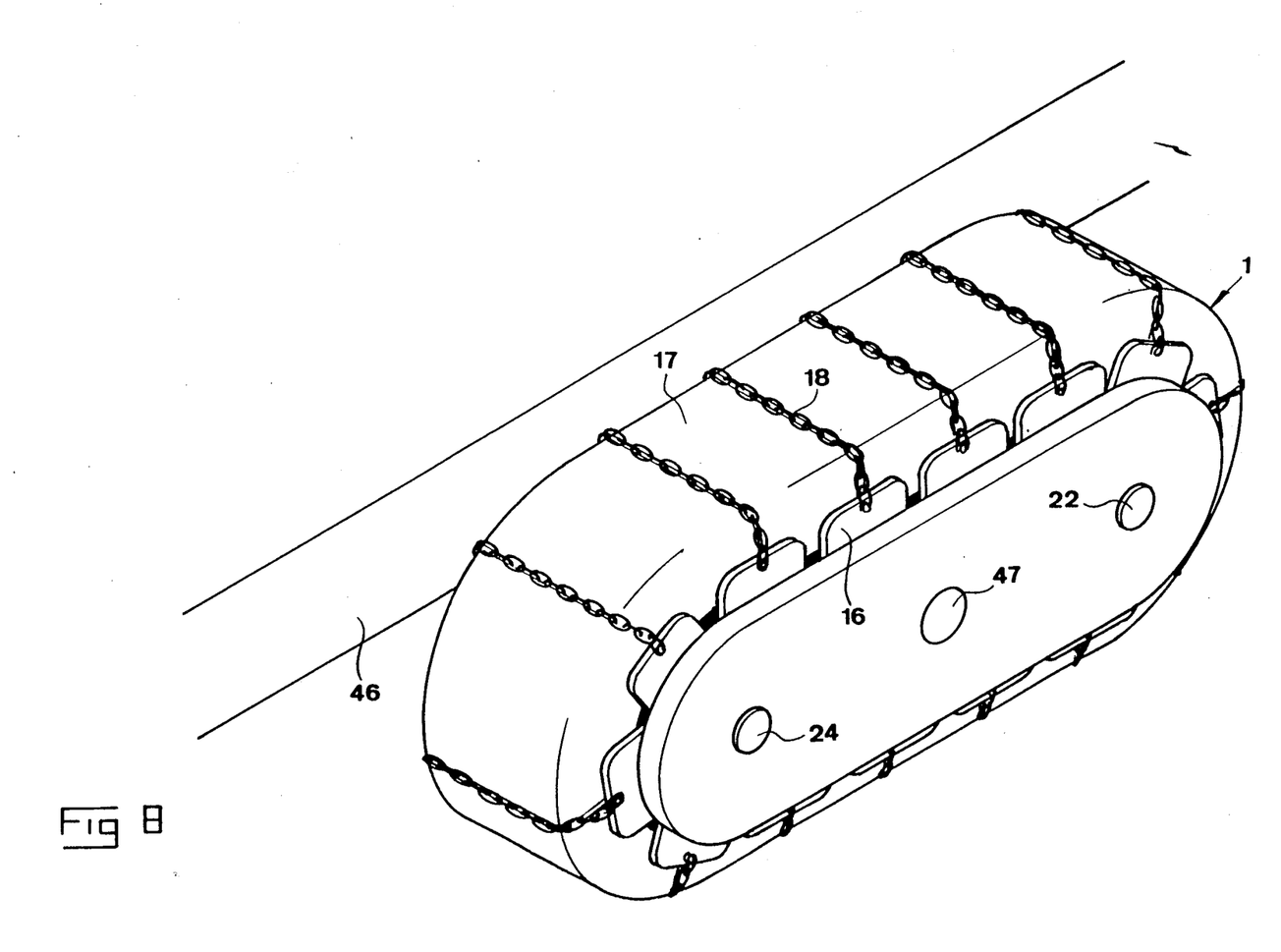
FIG. 8 is a perspective view illustrating the driving device according to the invention used for propelling a vehicle.

The driving device has above been described as used for displacing objects, such as tree trunks. However, it is also within the scope of the invention to design the driving device for co-operation with such supporting surfaces which are so fixedly located that instead the equipment, to which the driving device is mounted, is caused to be displaced relative to the supporting surface. An example of such an application is the vehicle field, i.e. the supporting surface is formed by the ground or other underlayer. A part of a vehicle chassis is indicated at 46 in FIG. 8. A driving device designed according to the invention and constructed is generally the same manner as that described hereinabove is mounted to the chassis in a pivotable way about a substantially horizontal axis 47. Thus, the entire device 1 may pivot about axis 47 in adjustment to the nature of the ground. The orbiting chain 16 will bring with it the rubber element 17, which in combination with the anti-skid chains 18 contact the ground over a large surface so that a minimum of damages thereon are obtained. The chain 16 is diverted by means of driving and/or diverting wheels rotating about axis 22 and 24.

The driving device according to the invention used on a crawler is illustrated in FIG. 9. The chain is as before denoted 16 whereas the rubber element is denoted 17. Driving and/or diverting wheels are denoted 23 and 25 whereas support wheels of a nature known per se are denoted 48. The rubber element 17 is in this case not co-ordinated to any anti-skid chains but instead rubber element 17 has on its external face a traction increasing pattern in the form of projections.

Figure 10:
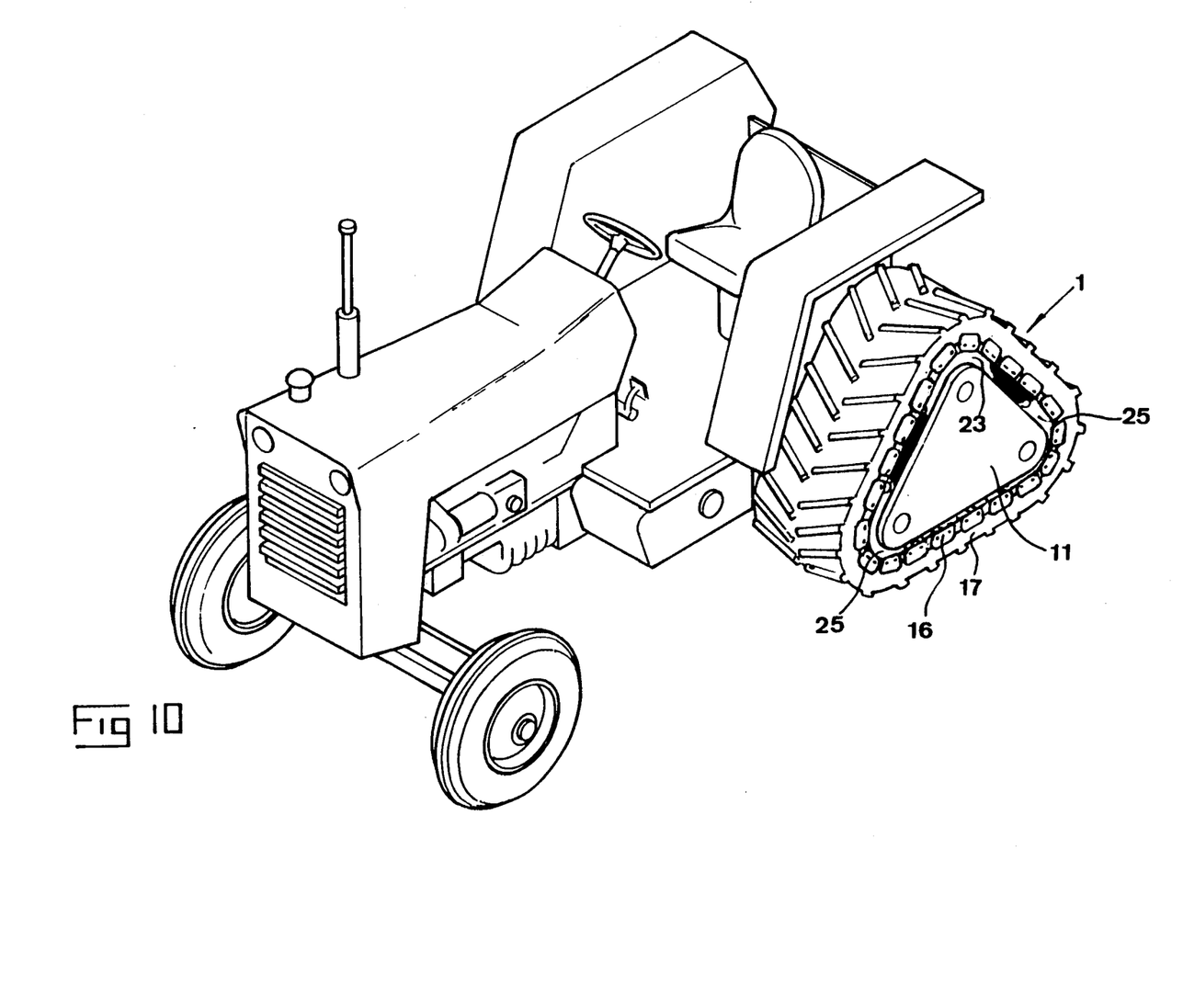
FIG. 10 is a perspective view illustrating the driving device according to the invention used in connection with a tractor.

The device according to the invention is in FIG. 10 illustrated in an embodiment, wherein chain 16 and rubber element 17 are guided to form a triangular configuration. More specifically, the driving device is used on a tractor, on which a driving wheel 23 for engagement with the chain 16 is intended to obtain driving power from the conventional driving shaft of the tractor which normally is intended to drive a circular wheel provided with a tire. The frame 11 of the driving device is attached to the chassis of the tractor and is limitedly pivotable in the vertical plane abut an axis coinciding with the axis of rotation of the driving wheel 23. The frame 11 carries rotatably two diverting wheels 25 located in the lower corners of the triangle configuration. The rubber element 17 contacts the ground over a large surface in the area between diverting wheels 25 and is also provided with a grip enhancing pattern.

Figure 13:
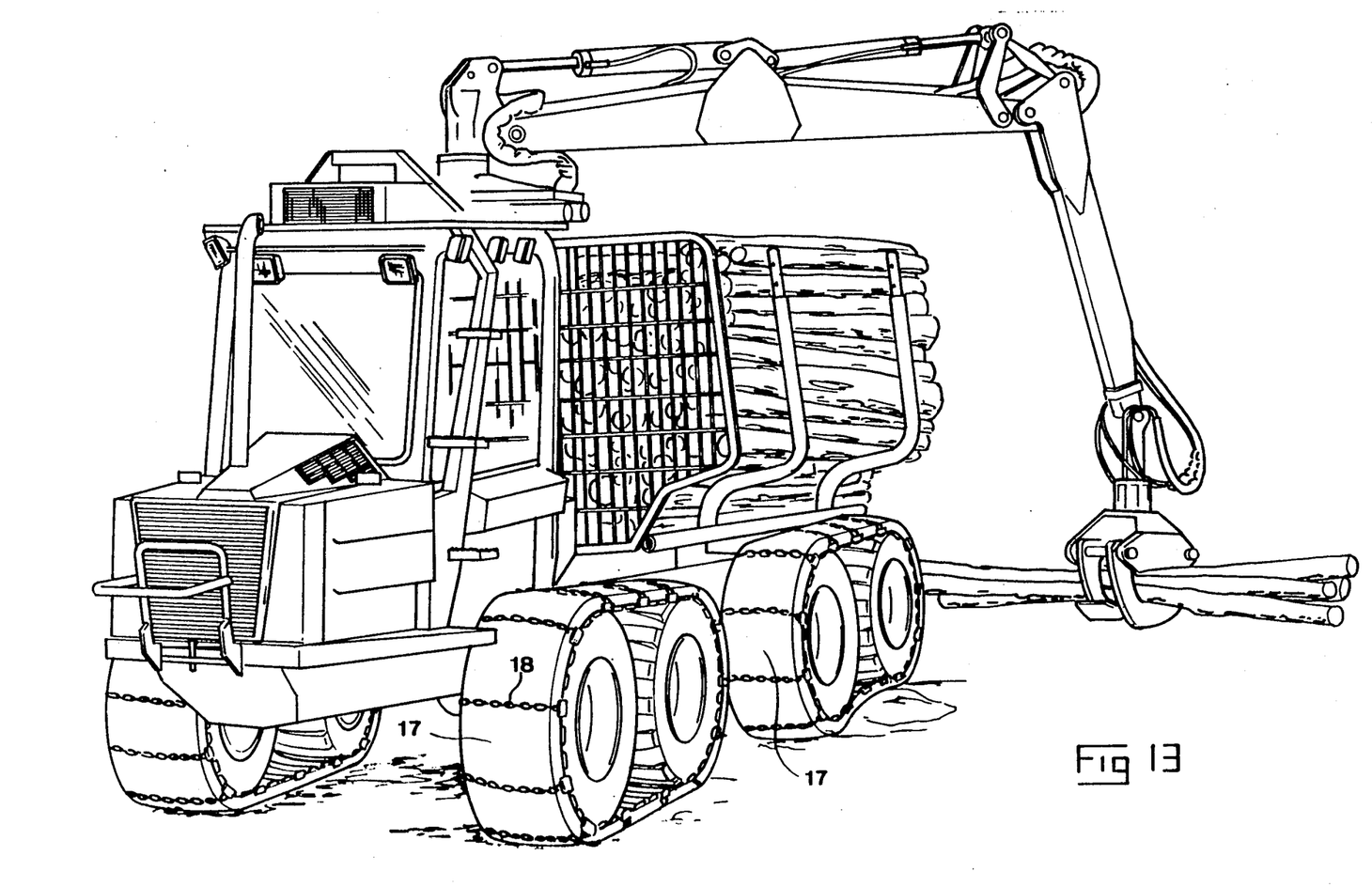
FIG. 13 is a perspective view of a forest vehicle with the driving device according to the invention.
Figure 14:
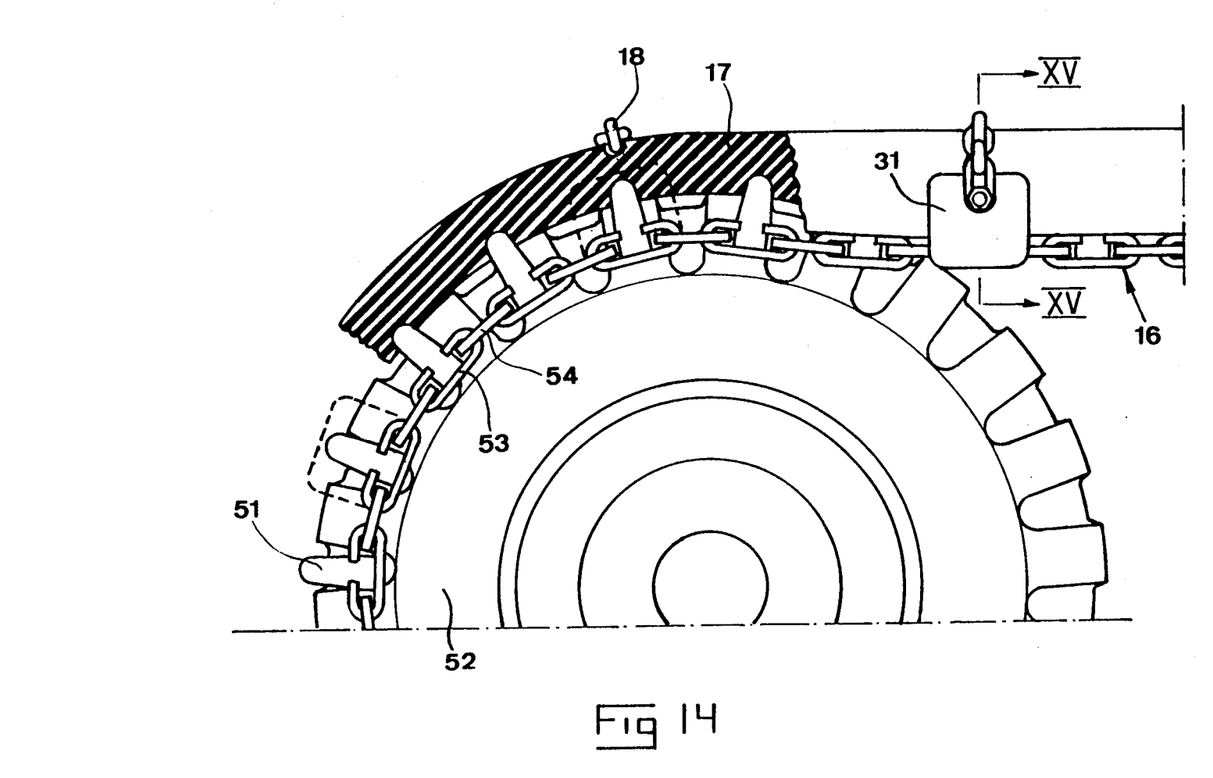
FIG. 14 is a partly cut side view of a part of the driving device.
Figure 15:
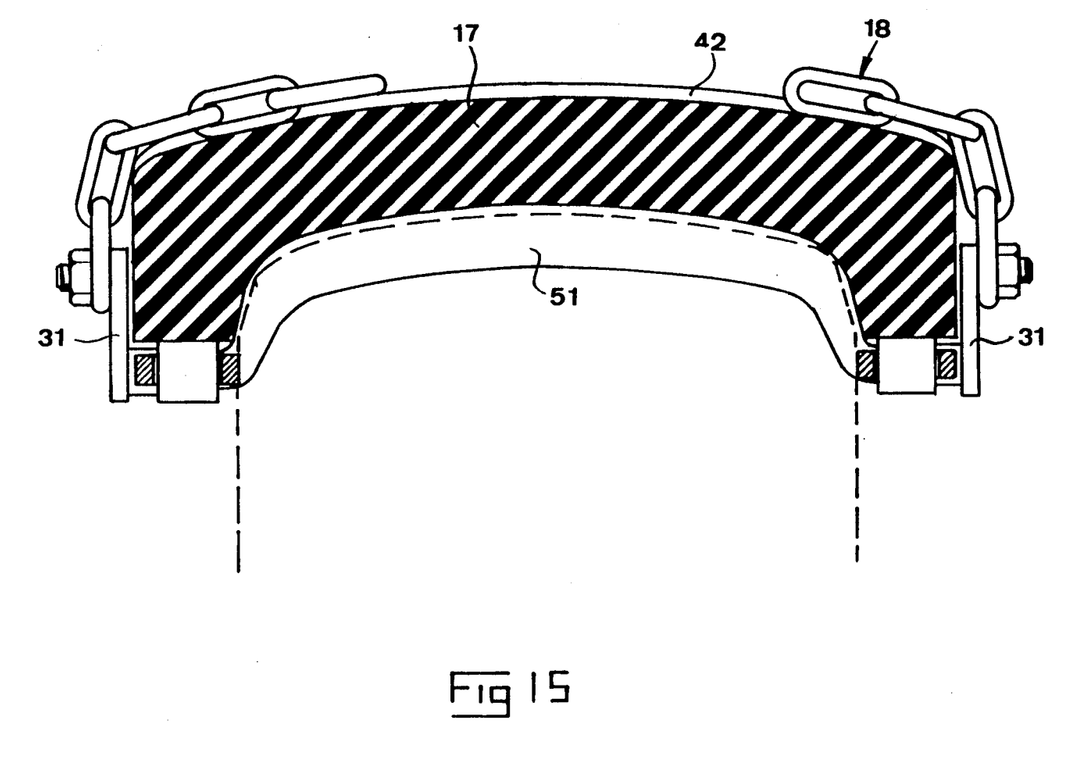
FIG. 15 is a section XV—XV in FIG. 14.

A further alternative of the driving device according to the invention used in connection with a vehicle, more specifically a forest vehicle, is illustrated in FIGS. 13-14. Several sets of wheels each comprising such driving devices are at hand and each wheel pair is in this case surrounded by a chain 16. This chain comprises elements 51 running across the rubber tires of the vehicle, said elements 51 possibly being, as appears from FIG. 15, somewhat bent in correspondence to the periphery of the tires. These transverse elements 51 are at each of the sides of the tire interconnected by means of chain links 53, 54, of which those denoted 53 are rigidly connected to the transverse elements 51. As is most clearly apparent from FIG. 15, a rubber element 17 is laid over the chain 16 and encloses the same externally, the sides of said rubber element 17 possibly being, as illustrated in FIG. 15, designed with an increased thickness in correspondence to the design of chain 16. Plate like retainer members 31, which between themselves locate and retain rubber elements 17, are suitably secured to at least some of the links denoted 53.

The rubber element 17 may be provided with a pattern on its side facing away from chain 16 so as to give a good grip relative to the ground. As an alternative or complement thereto, also anti-skid chains 18 may be arranged to extend across the external face of the rubber element. These chains 18 are intended to be secured with their ends to the sides of chain 16. It is suitable to secure the ends of chain 18 to retainer members 31. Furthermore, it is suitable to arrange in the external face of the rubber element 17 grooves 42, in which chains 18 are partially received.

It is suitable that rubber element 17 on its internal side comprises recesses, into which transverse elements 51 of chain 16 may fit so as to ensure an efficient driving power transmitting contact between the chain and rubber element.

As described with the aid of the embodiments in FIG. 11 it is suggested that, if so required, a direct mechanical connection is established between rubber element 17 and the chain by means of rods 45. Although such a connection technique and also other applicable connection techniques may be used if need arises, it is in the other described embodiments intended that the rubber element 17 shall enclose chain 16 without any connection proper. This means that the rubber element is intended to lie more or less tensioned about chain 16. Due to the contact between the rubber element and the chain located therewithin a certain form locking retaining action is nevertheless obtained between the rubber element and the chain. Furthermore, the rubber element is located sidewardly relative to the chain by means of the previously described retainer members 31. A certain retaining effect on the rubber element 17 is also obtained in case the transverse chains 18 are used.

The device is of course not only limited to the embodiments described above. It may for instance be mentioned that it is not necessary that the rubber element is in the form of a closed ring. Thus, it would be possible to arrange on the chain 16 several individual rubber elements, which in unison form a configuration substantially enclosing the chain loop. This plurality of rubber elements could possibly be interconnected by means of suitable connecting members, preferably vulcanized into the rubber elements so that the rubber elements after such connection form ring shape. Finally it may also be mentioned that it would be possible to entirely or partially embed the chain denoted 16 into one or more rubber elements or a rubber material, in which case the rubber element denoted 17 would enclose the partially or entirely embedded chain 16. Also other modifications are possible within the scope of the invention.

I claim:

1. A driving device, comprising:
    at least one chain in the form of a closed loop;
    a driving member;
    a plurality of diverting members in contact with said chain and determining the shape of said closed loop;
    said chain being connected to said driving member to cause said chain to orbit;
    at least one of said diverting members being formed by said driving member;
    a supporting surface adapted to be connected to a course of driving power;
    said chain facing towards said supporting surface and having a side portion located outermost in said closed loop;
    said supporting surface comprising at least one rubber element which is positioned on said side portion of said chain located outermost in said closed loop; and
    said rubber element being in operational driving force transmitting engagement with said chain.

2. A device according to claim 1 wherein the rubber element is in the form of a closed ring.

3. A device according to claim 1 wherein the chain comprises recesses or projections for driving force transmitting engagement with the rubber element.

4. A device according to claim 3 wherein the rubber element has an innerside facing towards the chain with recesses for receiving projections on the chain.

5. A device according to any preceding claim, wherein the chain comprises retainer members projecting in planes generally parallel to the plane of the loop and separated perpendicularly to the loop plane, the rubber element being located and retained between said retainer members.

6. A device according to claim 5 further comprising anchoring members extending between the separated retainer members, said anchoring members penetrating the rubber element.

7. A device according to claim 5 wherein the rubber element has an external face and edge portions, the device laid over the external face of the rubber element, said anti-skid elements being at the edge portions of the rubber element attached to the chain.

8. A device according to claim 7 wherein the anti-skid elements are attached to the retainer members.

9. A device according to claim 7 wherein the rubber element on its external face comprises grooves for receiving the anti-skid elements.

10. A device according to claim 5 wherein the chain loop plane is orientated generally horizontally during operation of the device, the retainer members being arranged at a lower edge of the chain in the position of the device for operation and projecting upwardly past adjacent portions of the rubber element.

11. A device according to claim 1 wherein the rubber element has a concave external face.

12. A device according to claim 1 wherein the rubber element comprises at least one cavity.

13. A device according to claim 12 in that the cavity is adapted to receive fluid with an overpressure relative to atmosphere.

* * * * *